United States Patent
Kitamura et al.

(10) Patent No.: US 7,754,318 B2
(45) Date of Patent: Jul. 13, 2010

(54) WATER-SOLUBLE FILM

(75) Inventors: Shuichi Kitamura, Osaka (JP);
Tomoyoshi Mizutani, Osaka (JP);
Mitsuhiro Hasegawa, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 240 days.

(21) Appl. No.: 11/922,072

(22) PCT Filed: Jun. 16, 2005

(86) PCT No.: PCT/JP2005/011071

§ 371 (c)(1),
(2), (4) Date: Dec. 12, 2007

(87) PCT Pub. No.: WO2006/134657

PCT Pub. Date: Dec. 21, 2006

(65) Prior Publication Data

US 2009/0291282 A1 Nov. 26, 2009

(51) Int. Cl.
*B32B 27/30* (2006.01)
(52) U.S. Cl. .................................. 428/220; 524/386
(58) Field of Classification Search ................. 428/220; 524/386
See application file for complete search history.

(56) References Cited

U.S. PATENT DOCUMENTS 3,528,921 A 9/1970 Gray
2004/0092635 A1* 5/2004 Kitamura et al. ............ 524/386

FOREIGN PATENT DOCUMENTS

| JP | 4-170405 | 6/1992 |
|---|---|---|
| JP | 9-316270 | 12/1997 |
| JP | 10-60207 | 3/1998 |
| JP | 2001-329130 | 11/2001 |
| JP | 2002-20569 | 1/2002 |
| JP | 2002-180097 | 6/2002 |
| JP | 2004-155922 | 6/2004 |
| JP | 2004-161823 | 6/2004 |
| JP | 2005-179390 | 7/2005 |
| WO | 2004/074351 | 9/2004 |

OTHER PUBLICATIONS

Japanese Office Action issued in corresponding Japanese Patent Application No. 2003-417980 and mailed Aug. 21, 2009, with its English translation—5 pages.

* cited by examiner

*Primary Examiner*—David R Sample
*Assistant Examiner*—Tahseen Khan
(74) *Attorney, Agent, or Firm*—Hamre, Schumann, Mueller & Larson, P.C.

(57) ABSTRACT

The present invention relates to a water-soluble film, which is a polyvinyl alcohol film comprising a polyvinyl alcohol resin (A), wherein the water-soluble film has a time for dissolution in water at 20° C. of not more than 60 seconds in terms of a film thickness of 76 μm, a b-value of the film is not more than 0.5, and a b-value of the film after leaving at 80° C. for 72 hr is not more than 1.0, preferably a water-soluble film comprising: a polyvinyl alcohol resin (A); at least two kinds of plasticizers (B); and a sulfite salt (C), wherein the content of the plasticizer (B) based on 100 parts by weight of the polyvinyl alcohol resin (A) is 5 to 50 parts by weight and the content ratio of the sulfite salt (C) to the plasticizer (B) (C/B: weight ratio) is more than 0.02 and not more than 0.35. According to the invention, there is provided a water-soluble film comprising a PVA resin as a main component, wherein the film is less likely to cause coloration at the time of film formation and coloration with time even upon contact with a chemical.

9 Claims, No Drawings

WATER-SOLUBLE FILM

TECHNICAL FIELD

The present invention relates to a water-soluble film comprising a polyvinyl alcohol (hereinafter, sometimes referred to as "PVA") resin as a main component. More particularly, the invention relates to a water-soluble film excellent in water solubility, which is less likely to cause coloration at the time of film formation and coloration with time even upon contact with a chemical.

BACKGROUND ART

Hitherto, a PVA film has been used, utilizing its water solubility, in applications for packaging (unit packaging) of chemicals such as an agricultural chemical and a detergent, a film for (water pressure) transfer printing, sanitary goods such as a napkin and a paper diaper, a filth-treating good such as an ostomy bag, a medical supply such as a blood-adsorbing sheet, temporary substrates such as a raising seedling sheet, a seed tape and a foundation cloth for embroidery, and the like.

In particular, in the application for unit packaging of chemicals such as an agricultural chemical and a detergent, there are advantages that time for weighing a chemical for each occasion of use can be saved and there is no occurrence of getting hands dirty.

As a water-soluble unit packaging bag for use in such applications, there are known, for instance, a water-soluble film comprising a modified polyvinyl alcohol containing 1 to 10% by mol of carboxyl group and having a degree of saponification of 80% by mol or more and a viscosity of 46 cps or more at 20° C. of 4% by weight aqueous solution thereof (see e.g., Patent Document 1); a water-soluble film comprising a modified PVA having a modification ratio of an anionic group of 2.0 to 40.0% by mol and a water-insoluble or sparingly-soluble fine powder having an average particle size of not more than 150 μm (see e.g., Patent Document 2); a water-soluble film incorporated with 5 to 30 parts by weight of a plasticizer, 1 to 10 parts by weight of a starch, and 0.01 to 2 parts by weight of a surfactant, based on 100 parts by weight of PVA (see e.g., Patent Document 3); a water-soluble film incorporated with 0.1 to 20 parts by weight of a reducing agent based on 100 parts by weight of a PVA resin (see e.g., Patent Document 4), and the like.

However, in such known water-soluble films, there arise problems that the color of the films is gradually changed into pale yellow by heat history received at the time of film formation and contact with a chemical to be packed and thus the commercial value of the products is remarkably impaired, and the like.

Patent Document 1: JP-A-4-170405
Patent Document 2: JP-A-10-060207
Patent Document 3: JP-A-2001-329130
Patent Document 4: JP-A-9-316270

DISCLOSURE OF THE INVENTION

Problems that the Invention is to Solve

An object of the invention is to provide a water-soluble film comprising a PVA resin as a main component, wherein the film is less likely to cause coloration at the time of film formation and coloration with time even upon contact with a chemical.

Means for Solving the Problems

As a result of the extensive studies, the present inventors have found that a water-soluble film conform to the above object, which is a PVA film comprising a PVA resin (A), wherein the water-soluble film has a time for dissolution in water at 20° C. of not more than 60 seconds in terms of a film thickness of 76 μm, a b-value of the film of not more than 0.5, and a b-value of the film after leaving at 8° C. for 72 hr of not more than 1.0, and thus have accomplished the invention.

Namely, the invention is as follows.

[1] A water-soluble film, which is a polyvinyl alcohol film comprising a polyvinyl alcohol resin (A), wherein the water-soluble film has a time for dissolution in water at 20° C. of not more than 60 seconds in terms of a film thickness of 76 μm, a b-value of the film of not more than 0.5 and, and a b-value of the film after leaving at 80° C. for 72 hr of not more than 1.0.

[2] A water-soluble film comprising: a polyvinyl alcohol resin (A); at least two kinds of plasticizers (B); and a sulfite salt (C), wherein the content of the plasticizer (B) based on 100 parts by weight of the polyvinyl alcohol resin (A) is from 5 to 50 parts by weight and the content ratio of the sulfite salt (C) to the plasticizer (B) (C/B: weight ratio) is more than 0.02 and not more than 0.35.

[3] The water-soluble film according to [1] or [2], wherein the PVA resin (A) is an anionic group-modified polyvinyl alcohol resin having an amount of anionic group modification of 1 to 10% by mol.

[4] The water-soluble film according to [3], wherein the anionic group-modified PVA resin is a carboxyl group-modified PVA resin.

[5] The water-soluble film according to [4], wherein the carboxyl group-modified PVA resin is a polyvinyl alcohol resin modified with any of maleic acid, a maleate, a monoalkyl maleate, and maleic anhydride.

[6] The water-soluble film according to any one of [1] to [5], wherein an average degree of saponification of the PVA resin (A) is from 80.0 to 99.9% by mol.

[7] The water-soluble film according to any one of [1] to [6], wherein a viscosity at 20° C. of a 4% by weight aqueous solution of the PVA resin (A) is from 10 to 35 mPa·s.

[8] The water-soluble film according to any one of [2] to [7], wherein the plasticizer (B) at least comprises:
(1) a plasticizer (B1) having a molecular weight of less than 100 and three hydroxyl groups in the molecule; and
(2) a plasticizer (B2) having a molecular weight of 100 to 200 and three or more hydroxyl groups in the molecule.

[9] The water-soluble film according to [8], wherein the plasticizer (B1) is glycerin and the plasticizer (B2) is diglycerin and/or trimethylolpropane.

[10] The water-soluble film according to any one of [2] to [9], wherein the sulfite salt (C) is sodium sulfite.

[11] The water-soluble film according to any one of [2] to [10], which further comprises a surfactant (D).

[12] The water-soluble film according to any one of [1] to [11], wherein a film thickness is from 5 to 100 μm.

[13] The water-soluble film according to any one of [1] to [12], which is used for packaging a liquid detergent having a pH of 6 to 12 and a water amount of less than 10% by weight.

[14] A package of a chemical, wherein 5 to 50 g of a liquid chemical or a powder chemical is seal-packed with the water-soluble film according to any one of [1] to [13].

ADVANTAGE OF THE INVENTION

The water-soluble film of the invention is a water-soluble film excellent in water solubility, which is less likely to cause coloration at the time of film formation and coloration with time even upon contact with a chemical. Therefore, the film can be utilized in various applications, e.g., applications for packaging (unit packaging) of chemicals such as an agricultural chemical and a detergent, a film for (water pressure) transfer printing, sanitary goods such as a napkin and a paper diaper, a filth-treating good such as an ostomy bag, a medical supply such as a blood-adsorbing sheet, temporary substrates such as a raising seedling sheet, a seed tape and a foundation cloth for embroidery, and the like. In particular, it is very useful in an application for packaging of a chemical (especially a liquid detergent).

BEST MODE FOR CARRYING OUT THE INVENTION

The water-soluble film of the invention is a PVA film comprising a PVA resin (A), wherein the water-soluble film has a time for dissolution in water at 20° C. of not more than 60 seconds in terms of a film thickness of 76 μm, a b-value of the film of not more than 0.5, and a b-value of the film after leaving at 80° C. for 72 hr of not more than 1.0.

Moreover, the film of the invention has a time for dissolution in water at 20° C. of not more than 60 seconds, preferably not more than 50 seconds, more preferably not more than 40 seconds, in terms of a film thickness of 76 μm. When such a time for dissolution is more than 60 seconds, the objective water solubility of the invention is not obtained. Namely, in the case where the film is not dissolved even when the time is more than 60 seconds, there arises an inconvenience that, for example, when washing is performed using a detergent packed with the film, the detergent is not well dispersed in a water tank or a part of the film may attach to a cloth, or when the film has been stored for a long time, the film do not dissolve in water.

The phrase "time for dissolution in water at 20° C." as used herein denotes a time (second) for dissolution of a film when a film sample is cut into a size of 40 mm×40 mm, fixed with putting it between slide mounts, then purified water (1 liter) is poured in a 1 liter beaker, the film fixed with slide mounts is immersed in such water kept at a water temperature of 20° C. under stirring with a magnetic stirrer (length of a rotor: 3 cm, rotation number: 200 to 300 rpm), and the stirring is kept. The term "dissolution" as used herein denotes that the residue of the film can no longer be visually observed, but herein the term of dissolution in the invention also encompasses the state that an insoluble fine particle having a diameter of not more than 1 mm is dispersed.

In this connection, in the case where the film thickness is 76 μm, the time for dissolution may be determined by a dissolution test as it is, but in the case where the film thickness is other than 76 μm, it is determined by the following equation for conversion.

Time for dissolution in terms of 76 μm (second)=(76/film thickness)$^2$×(time for dissolution at the film thickness (second))

Furthermore, the film of the invention has a b-value of the film of not more than 0.5, preferably from −0.1 to 0.5, and a b-value of the film after leaving at 80° C. for 72 hr of not more than 1.0, preferably from −0.5 to 1.0. When such b-value of the film falls out of the above range, the object of the invention is not achieved. The film having the b-value according to the invention has, for example, a high transparency, so that it has an advantage that the commercial value of a white detergent can be kept high. In this connection, the b-value in the invention is a value obtained based on color specification value Hunter's Lab and is measured in accordance with JIS Z 8730.

The water-soluble film as above is not particularly limited, but is particularly preferably the following film.

Namely, it is a water-soluble film comprising: a PVA resin (A); at least two kinds of plasticizers (B); and a sulfite salt (C), wherein the content of the plasticizer (B) based on 100 parts by weight of the PVA resin (A) is from 5 to 50 parts by weight and the content ratio of the sulfite salt (C) to the plasticizer (B) (C/B: weight ratio) is more than 0.02 and not more than 0.35.

The PVA resin (A) for use in the invention can be produced by a known method without particular limitation. Namely, it can be obtained by polymerizing a vinyl ester compound and saponifying the resulting vinyl ester polymer.

As such a vinyl ester compound, vinyl formate, vinyl acetate, vinyl trifluoroacetate, vinyl propionate, vinyl butyrate, vinyl caprate, vinyl laurate, vinyl versatate, vinyl palmitate, vinyl stearate, and the like may be used alone or in combination therewith. Vinyl acetate is practically preferred.

As the PVA resin (A) for use in the invention, an anionic group-modified PVA resin is preferred in view of solubility. Moreover, as the kind of the anionic groups, there may be mentioned a carboxyl group, a sulfonic acid group, a phosphoric acid group, and the like. Of these, from the above point of view, a carboxyl group and a sulfonic acid group are preferred and, in particular, a carboxyl group is preferred.

A carboxyl group-modified PVA resin which is a particularly preferable PVA resin (A) in the invention can be prepared by an arbitrary method. For example, there may be mentioned: (i) a method of a copolymerization of carboxyl group-containing unsaturated monomer and a vinyl ester compound followed by a saponification; (ii) a method of a polymerization of a vinyl ester compound in the presence of a chain transfer agent such as a carboxyl group-containing alcohol, aldehyde, or thiol, followed by a saponification, and the like. These methods will be more specifically explained below, but the invention is not limited thereto.

(i) Method of Copolymerization of Carboxyl Group-containing Unsaturated Monomer and Vinyl Ester Compound Followed by Saponification As the carboxyl group-containing monomer in this case, there may be mentioned a monomer such as an ethylenically unsaturated dicarboxylic acid such as maleic acid, fumaric acid, or itaconic acid; an ethylenically unsaturated dicarboxylic acid monoester such as a monoalkyl maleate, a monoalkyl fumarate, or a monoalkyl itaconate ester; an ethylenically unsaturated dicarboxylic acid diester such as a dialkyl maleate, a dialkyl fumarate, or a dialkyl itaconate ester, provided that it is necessary that these diesters are converted into a carboxyl group by hydrolysis when the copolymers are saponified; an ethylenically unsaturated carboxylic anhydride such as maleic anhydride or itaconic acid anhydride; an ethylenically unsaturated monocarboxylic acid such as (meth)acrylic acid or crotonic acid; and salts thereof. Of these, maleic acid, a monoalkyl maleate, a maleate, and maleic anhydride are particularly preferably used, and a monoalkyl maleate is most preferably used.

(ii) Method of Polymerization of Vinyl Ester Compound in the Presence of Chain Transfer Agent such as Carboxyl Group-containing Alcohol, Aldehyde, or Thiol, Followed by Saponification In this case, a compound derived from a thiol exhibiting the large effect of a chain transfer is particularly effective, and the following compounds may be mentioned:

[Chem 1]

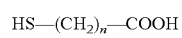  (1)

[Chem 2]

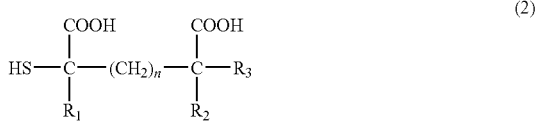

(2)

wherein n is an integer of 0 to 5 and R₁, R₂, and R₃ each is a hydrogen atom or a lower alkyl group optionally having a substituent (preferably an alkyl group having 1 to 6 carbon atoms such as methyl, ethyl, propyl, butyl, pentyl, or hexyl) in the above general formulae (1) and (2).

[Chem 3]

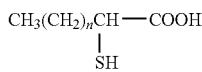

(3)

wherein n is an integer of 0 to 20 in the above general formula (3). Also, salts of the compounds represented by the above general formulae (1) to (3) may be mentioned.

Specifically, there may be mentioned mercaptoacetic acid, 2-mercaptopropionic acid, 3-mercaptopropionic acid, 2-mercaptostearic acid, and the like.

Moreover, at production of a sulfonic acid-modified PVA or a phosphoric acid-modified PVA, there may be mentioned: a method of a copolymerization of olefin sulfonic acid such as ethylenesulfonic acid, allylsulfonic acid, methallylsulfonic acid, styrenesulfonic acid, and 2-acrylamido-2-methylpropanesulfonic acid, or a salt thereof, followed by a saponification in the case of the sulfonic acid-modified PVA; or a method of a copolymerization of ethylenephosphonic acid and the like, followed by a saponification in the case of the phosphoric acid-modified PVA.

Moreover, in the PVA resin (A) for use in the invention, the polymerization may be also carried out, other than a carboxyl group-containing unsaturated monomer, a sulfonic acid group-containing unsaturated monomer, a phosphoric acid group-containing unsaturated monomer, and a vinyl ester compound as mentioned above at such polymerization, in the presence of an other general monomer in a small amount in a range where the water solubility is not impaired. The following may be mentioned as these monomers.

For example, there may be mentioned an olefin such as ethylene, propylene, isobutylene, α-octene, α-dodecene, or α-octadecene; a complete alkyl ester of an unsaturated acid such as acrylic acid, methacrylic acid, crotonic acid, maleic acid, maleic anhydride, or itaconic acid; a nitrile such as acrylonitrile or methacrylonitrile; an amide such as acrylamide or methacrylamide; an alkyl vinyl ether; N-acrylamidomethyltrimethyl ammonium chloride, allyltrimethyl ammonium chloride; dimethyldiallyl ammonium chloride; dimethylallyl vinyl ketone; N-vinylpyrrolidone; vinyl chloride; vinylidene chloride; a polyoxyalkylene (meth)allyl ether such as polyoxyethylene (meth)allyl ether or polyoxypropylene (meth)allyl ether; a polyoxyalkylene (meth)acrylate such as polyoxyethylene (meth)acrylate or polyoxypropylene (meth)acrylate; a polyoxyalkylene (meth)acrylamide such as polyoxyethylene (meth)acrylamide or polyoxypropylene (meth)acrylamide; polyoxyethylene(1-(meth)acrylamido-1,1-dimethylpropyl) ester; polyoxyethylene vinyl ether; polyoxyproylene vinyl ether; polyoxyethylene allylamine; polyoxypropylene allylamine; polyoxyethylene vinylamine; polyoxypropylene vinylamine, diacrylacetone amide, or the like.

Furthermore, there may be mentioned a cationic group-containing monomer such as N-acrylamidomethyltrimethyl ammonium chloride, N-acrylamidoethyltrimethyl ammonium chloride, N-acrylamidopropyltrimethyl ammonium chloride, 2-acryloxyethyltrimethyl ammonium chloride, 2-methacryloyloxyethyltrimethyl ammonium chloride, 2-hydroxy-3-methacryloxypropyltrimethyl ammonium chloride, allyltrimethyl ammonium chloride, methallyltrimethyl ammonium chloride, 3-butenetrimethyl ammonium chloride, dimethyldiallyl ammonium chloride, or diethyldiallyl ammoniumu chlorid.

Moreover, a polyvinyl alcohol resin containing an acetoacetyl group or the like can be also used.

In the invention, these monomers can be copolymerized in a range where the object of the invention is not inhibited, e.g., from 0.5 to 10% by mol, further from 1 to 7% by mol.

In the invention, it is also possible to use the above PVA resin (A) not only alone but also in combination with two or more kinds thereof.

The above PVA resin (A) is obtained by polymerization (or copolymerization) of the monomer such as the above vinyl ester compound.

At the polymerization (or copolymerization) of the monomer, a known polymerization method is arbitrarily used without particular limitation. Usually, a solution polymerization using, as a solvent, an alcohol such as methanol, ethanol or isopropyl alcohol, or the mixture thereof, is carried out. Emulsion polymerization and suspension polymerization are also possible.

In the case of producing the above carboxyl group-modified PVA resin, as a manner of charging a monomer in such a solution polymerization, arbitrary manners can be used, e.g., a manner wherein a whole amount of a vinyl ester compound and a part of a carboxyl group-containing unsaturated monomer are charged and a polymerization is started, and the remaining unsaturated monomer is continuously or stepwise added during the polymerization period; a manner wherein the former is charged at one time, and the like.

In this case that there is a concern that the modified PVA resin is insolubilized by formation of a lactone ring or the like, as a measure, a vinyl ester can be copolymerized in an organic solvent in the presence of 0.5 to 2.0 molar equivalents of an alkali with respect to maleic acid or maleic anhydride, which is a method known to provide PVA having a good water solubility.

The polymerization reaction (or copolymerization reaction) is carried out using a known radical polymerization catalyst such as azobisisobutyronitrile, acetyl peroxide, benzoyl peroxide, or lauroyl peroxide.

The reaction temperature is selected from the range of about 35° C. to the boiling point, preferably 40° C. to 80° C., particularly preferably 50° C. to 80° C.

At the saponification, the obtained polymer (or copolymer) is dissolved in an alcohol and carried out in the presence of an alkali catalyst. As the alcohol, there may be mentioned methanol, ethanol, butanol and the like. The concentration of the polymer (or copolymer) in the alcohol is selected from the range of 20 to 50% by weight.

As the saponification catalyst, an alkali catalyst, e.g., an alcoholate or a hydroxide of an alkali metal such as sodium hydroxide, potassium hydroxide, sodium methylate, sodium ethylate, or potassium methylate can be used. It is also possible to use an acid catalyst depending on the situation. The usage of the saponification catalyst is necessary to being from 1 to 100 millimolar equivalents based on the vinyl ester compound.

In the case of producing the above carboxyl group-modified PVA resin, usually, the carboxyl group in the carboxyl group-containing PVA resin prepared by the method is in a state of alkali metal salt type such as sodium salt. When there is a concern of insolubilization in water by a formation of a lactone ring at the time of drying of the PVA resin and the like, it can be avoided by substituting the sodium salt with a salt of a bivalent metal such as calcium, magnesium, or copper.

Moreover, in the case of producing the above carboxyl group-modified PVA resin, a method other than the above methods, e.g. by reaction of PVA (partially saponified or completely saponified one) with a carboxyl group-containing compound having a functional group reactive with a hydroxyl group, such as a dicarboxylic acid, an aldehydecarboxylic acid, or a hydroxycarboxylic acid, and the like can be carried out.

Furthermore, in the case of the sulfonic acid group-modified PVA resin modified by a sulfonic acid group, it is also possible to produce the resin by a method of Michael addition of a monomer having a sulfonic acid group to PVA.

An average degree of saponification of the above PVA resin (A) is preferably from 80.0 to 99.9% by mol, more preferably 90.0 to 98.5% by mol, particularly preferably from 92.0 to 97.0% by mol. When the average degree of saponification is less than 80.0% by mol, the water solubility of the film may be lowered with time depending on a pH of a chemical to be packaged, or the like troubles may occur. When the average degree of saponification is more than 99.9% by mol, the water solubility is markedly lowered by heat history at the time of film formation, so that the cases are not preferably.

A viscosity at 20° C. of a 4% by weight aqueous solution of the above PVA resin (A) is preferably from 10 to 35 mPa·s, more preferably from 15 to 30 mPa·s, particularly preferably from 15 to 25 mPa·s. When the viscosity is less than 10 mPa·s, the mechanical strength of the film as a packaging material may be lowered. When the viscosity is more than 35 mPa·s, the viscosity of an aqueous solution at the film formation is high and thus the productivity may be lowered, so that the cases are not preferred.

The above average degree of saponification is measured according to JIS K 6726 3.5, and the viscosity of 4% by weight aqueous solution is measured according to JIS K 6726 3.11.2.

In the invention, an amount of modification of the preferred above anionic group-modified PVA resin (A) is preferably from 1 to 10% by mol, more preferably 2 to 6% by mol, particularly preferably 3 to 5% by mol. When the amount of modification is less than 1% by mol, the water solubility might be markedly lowered by an influence of a chemical such as a liquid detergent. When the amount of modification is more than 10% by mol, the productivity of a PVA bulk powder might be lowered, the biodegradability might be lowered, or the like. Thus, the cases are not preferred.

In the invention, it is necessary to use at least two kinds of plasticizers (B) in combination. In the case where the plasticizer is one kind, there arise inconveniences that a sulfite-salt is precipitated on the film surface immediately after the film formation, the strength of the film is lowered, and the like.

The plasticizer (B) for use in the invention is not particularly limited. Examples thereof include diethylene glycol, trietylene glycol, propylene glycol, dipropylene glycol, pentaerythritol, polyethylene glycol, polypropylene glycol, bisphenol A, bisphenol S, N-methylpyrrolidone, sorbitol, mannitol, xylitol, 2,3-butanediol, 1,3-butanediol, reducing maltose starch syrups, reducing lactose, reducing starch syrup (reducing starch saccharified product), and the like. However, in the invention, particularly one at least comprising:

(1) a plasticizer (B1) having a molecular weight of less than 100 and three hydroxyl groups in the molecule; and (2) a plasticizer (B2) having a molecular weight of 100 to 200 and three or more hydroxyl groups in the molecule is preferred.

As the plasticizer (B1), glycerin may be preferably mentioned.

As the plasticizer (B2), diglycerin or trimethylolpropane may be preferably mentioned.

As the particularly preferable plasticizer (B), one at least comprising glycerin and diglycerin and/or trimethylolpropane may be mentioned.

In the plasticizer (B) comprising the above plasticizer (B1) and plasticizer (B2), a content ratio of (B2) and (B1) (B2/B1: weight ratio) is preferably from 15/85 to 85/15, particularly preferably from 20/80 to 80/20, further preferably from 25/75 to 75/25. When the content ratio is less than 15/85, the blocking resistance property tends to be lowered. When the content ratio is more than 85/15, the flexibility with time tends to be lowered.

The content (total amount) of the plasticizer (B) in the film is from 5 to 50 parts by weight, preferably 10 to 40 parts by weight, more preferably 15 to 35 parts by weight, based on 100 parts by weight of the PVA resin (A). When the content is less than 5 parts by weight, a plasticizing effect is hardly obtained. When the content is more than 50 parts by weight, there arise inconveniences that the strength of the film is lowered, the plasticizer bleeds from the film with time, and the like.

The water-soluble film of the invention further comprises typically a sulfite salt (C). In the case of comprising no sulfite salt (C), there arise an inconvenience that the coloration of the film increases upon contact the film with a chemical such as a liquid detergent.

As the sulfite salt (C) for use in the invention, there may be mentioned such as an alkali metal salt of sulfurous acid, for instance sodium sulfite or potassium sulfite, preferably sodium sulfite.

In the invention, a content ratio of the sulfite salt (C) in the film to the plasticizer (B) (total amount) (C/B; weight ratio) is more than 0.02 and not more than 0.35, preferably from 0.025 to 0.35, more preferably from 0.025 to 0.3. When the content ratio is 0.02 or less, the effect of suppressing coloration in the film does not appear. On the other hand, when the content ratio is more than 0.35, the sulfite salt precipitates on the film surface immediately after the film formation, so that there arise inconveniences that a poor film appearance, a lowering of storage stability, a deterioration of workability such as heat-sealing, a lowering of a film strength.

In addition, instead of the sulfite salt (C), for example a similar effect can be obtained by incorporating a compounding agent such as citric acid or tartaric acid.

Thus, in the invention, a resin composition [I] is obtained by incorporating at least two kinds of plasticizers (B) and the sulfite salt (C) to the above PVA resin (A) and then film formation is performed. To the resin composition [I], if necessary, it is possible to further incorporate a surfactant (D), a filler (E), a starch (F), and the like.

The above surfactant (D) is not particularly limited. Examples thereof include polyoxyethylene nonyl phenyl ether, polyoxyethylene octyl nonyl ether; polyoxyethylene dodecyl phenyl ether; polyoxyethylene alkyl allyl ether, polyoxyethylene sorbitan monolaurate; polyoxyethylene sorbitan monopalmitate; polyoxyethylene sorbitan monostearate; polyoxyethylene sorbitan monooleate; a polyoxyalkylene alkyl ether phosphate monoethanolamine salt; polyoxyethylene alkylamino ether such as polyoxyethylene laurylamino ether, polyoxyethylene stearylamino ether, and the like. The surfactants may be used alone or in combination with two or more kinds thereof. Of these, a polyoxyalkylene alkyl ether phosphate monoethanolamine salt and polyoxyethylene alkylamino ether are preferable from the viewpoint of peel property.

A content of the surfactant (D) in the film is not particularly limited, but is preferably from 0.01 to 3.0 parts by weight, particularly preferably 0.03 to 2.5 parts by weight, more preferably 0.05 to 2.0 parts by weight, based on 100 parts by weight of the PVA resin (A). When the content is less than 0.01 part by weight, the peel property of the film formed on a metallic surface such as drum or belt of the film-forming apparatus is lowered, so it is difficult to produce the film. When the content is more than 3.0 parts by weight, the surfactant bleeds on the film surface and causes blocking, and thus handling property decreases, so that the cases are not preferred.

As the above filler (E), an inorganic filler or an organic filler may be mentioned.

The inorganic filler is preferably one having an average particle size of 1 to 10 μm. When the average particle size is less than 1 μm, the effect of suppressing blocking of a film is small. When the average particle size is more than 10 μm, the appearance of a film is deteriorated to decrease the commercial value. Thus, the cases are not preferred. Specific examples thereof include talc, clay, silicon dioxide, diatomaceous earth, kaolin, mica, asbestos, gypsum, graphite, glass balloon, glass beads, calcium sulfate, barium sulfate, ammonium sulfate, calcium sulfite, calcium carbonate, whisker-like calcium carbonate, magnesium carbonate, dawsonite, dolomite, potassium titanate, carbon black, glass fiber, alumina fiber, boron fiber, processed mineral fiber, carbon fiber, carbon hollow beads, bentonite, montmorillonite, copper powder, sodium sulfate, potassium sulfate, zinc sulfate, copper sulfate, iron sulfate, magnesium sulfate, aluminum sulfate, potassium aluminum sulfate, ammonium nitrate, sodium nitrate, potassium nitrate, aluminum nitrate, ammonium chloride, sodium chloride, potassium chloride, magnesium chloride, calcium chloride, sodium phosphate, potassium chromate, calcium citrate, and the like.

A content of the inorganic filler in the film is not particularly limited, but is preferably from 0.1 to 50 parts by weight, particularly preferably from 0.5 to 10 parts by weight, based on 100 parts by weight of the PVA resin. When the content is less than 0.1 part by weight, the effect of suppressing blocking is small. When the content is more than 50 parts by weight, the degree of the tensile elongation of the film is lowered. Thus, the cases are not preferred.

The organic filler is preferably one having an average particle size of preferably 0.5 to 10 μm, more preferably 0.5 to 7 μm, particularly preferably 0.5 to 5 μm, further preferably 0.5 to 3 μm. When the average particle size is less than 0.5 μm, the cost is high. When the average particle size is more than 10 μm, the dispersibility is lowered. Thus the cases are not preferred.

Specific examples of the organic fillers include a starch, a melamine resin, a polymethyl (meth)acrylate resin, a polystyrene resin, biodegradable resins such as polylactic acid and rice starch. In particular, a polymethyl (meth)acrylate resin, a polystyrene resin and a biodegradable resin are preferably used.

A content of the organic filler is not particularly limited, but is preferably from 5 to 25 parts by weight, particularly preferably 5 to 15 parts by weight, based on 100 parts by weight of the PVA resin (A). When the content is less than 5 parts by weight, the mechanical strength as a packaging material is insufficient. When the content is more than 25 parts by weight, the flexibility of the film is not obtained. Thus, the cases are not preferred.

Moreover, the above starch (F) is incorporated for the purpose of preventing a blocking or adjusting the mechanical strength. The average particle size is preferably 10 μm or more. Specific examples thereof include a raw starch such as corn starch, potato starch, sweet potato starch, wheat starch, cassava starch, sago starch, tapioka starch, corn starch, rice starch, bean starch, kudzu starch, bracken starch, lotus starch, or water chestnut starch; a physically modified starch such as α-starch, discrete amylose, or moist heat processed starch; an enzyme-modified starch such as hydroyzed dextrin, enzyme decomposed dextrin, or amylose; a chemically decomposed starch such as acid treated starch, hypochlorous acid-oxidized starch, or dialdehyde starch; and a chemically modified starch derivative such as esterified starch, etherified starch, cationized starch, or crosslinked starch. As the esterified starch of the chemically modified starch, there may be mentioned acetic acid-esterified starch, succinic acid-esterified starch, nitric acid-esterified starch, phosphoric acid-esterified starch, urea-phosphoric acid-esterified starch, xanthic acid-esterified starch, acetoacetic acid-esterified starch, and the like. As the etherified starch, there may be mentioned allyl-etherified starch, methyl-etherified starch, carboxymethyl-etherified starch, hydroxyethyl-etherified starch, hydroxypropyl-etherified starch, and the like. As the cationized starch, there may be mentioned a reaction product of starch and 2-diethylaminoethyl chloride, a reaction product of starch and 2,3-epoxypropyltrimethylammonium chloride, and the like. As the crosslinked starch, there may be mentioned formaldehyde-crosslinked starch, epichlorohydrin-crosslinked starch, phosphoric acid-crosslinked starch, acrolein-crosslinked starch, and the like. Of these, a raw starch is preferred from the easiness of acquisition and economical efficiency.

A content of such a starch (F) in the film is not particularly limited, but is preferably from 0.1 to 40 parts by weight, particularly preferably from 1 to 30 parts by weight, based on 100 parts by weight of the PVA resin (A). When the content is less than 0.1 part by weight, the effect of suppressing blocking is low and the mechanical strength-improving effect is small. When the content is more than 40 parts by weight, the appearance and the degree of the tensile elongation of the film are markedly lowered. Thus, the cases are not preferred.

In the invention, a PVA film may be obtained by forming a film (film formation) from the resin composition [I] comprising the plasticizer (B) and the sulfite salt (C) in the PVA resin (A) (if necessary, the resin composition [I] may further comprise the surfactant (D), the filler (E) and/or the starch (F)), and at the film formation, a method, e.g., a casting method or the like can be employed without particular limitation.

For example, when the casting method is more specifically explained, water is added to the above resin composition [I] (powder) to give an aqueous dispersion or water solubility of a resin composition [I] having a solid concentration of 10 to 40% by weight, preferably 11 to 39% by weight, more preferably 12 to 38% by weight. Alternatively, to the aqueous PVA resin solution whose solid concentration is adjusted by adding water to the PVA resin (A) (powder) and to 10 to 40% by weight, preferably 11 to 38% by weight, more preferably 12 to 35% by weight, the plasticizer (B) and the sulfite salt (C)

are added to give an aqueous dispersion or aqueous solution of a resin composition [I] having a solid concentration of 10 to 40% by weight, preferably 11 to 39% by weight, more preferably 12 to 38% by weight.

Such an aqueous dispersion or aqueous solution is passed through a slit such as T-die, cast onto a metal surface of endless belt or drum roll (preferably endless belt in view of productivity) having a surface temperature of 50 to 100° C. and preferably 55 to 95° C., dried, and further heat-treated if necessary. Thus a PVA film of the invention can be obtained.

When the solid concentration of the above resin composition [I] is less than 10% by weight or more than 40% by weight, the film forming property is worse, so that the case is not preferred. When the temperature of the metal surface is less than 50° C., a drying efficiency is lowered, and when it is more than 100° C., foaming may occur, so that the cases are not preferred.

Moreover, using an applicator, a PVA film can also be obtained by casting the aqueous dispersion or aqueous solution of the resin composition [I] onto a metal substrate or a plastic substrate such as polyethylene terephthalate film or polyethylene film, and drying it.

The casting method has been explained, but the present invention is not limited thereto.

With regard to the solubility of the PVA film thus obtained, as mentioned above, it is necessary that a time for dissolution in water at 20° C. is not more than 60 seconds. The adjustment of such solubility is achieved by arbitrarily adjusting the degree of saponification of the PVA resin, the viscosity of a 4% by weight aqueous solution, the degree of polymerization, and the modifying species and amount of modification in the case of the modified PVA, and the drying temperature and the time at film formation, the film thickness, and the like.

In the PVA film thus obtained, the thickness thereof may vary depending on an use thereof, but in general it is preferred that the thickness is from 5 to 100 μm, particularly 10 to 80 μm. When the thickness is less than 5 μm, the mechanical strength of the film decreases, and when the thickness is more than 100 μm, the rate of dissolution in cold water is very low and the film formation efficiency is also low.

Moreover, the surface of the PVA film may be plane or one or both surfaces may also be subjected to an embossed pattern, a satin finished surface pattern, or the like.

The water-soluble film of the invention may comprise, so long as the objects of the present invention are not impaired, other water-soluble polymers (an unmodified PVA resin, a modified PVA resin prepared by modification other than anionic group modification, sodium polyacrylate, polyethylene oxide, polyvinylpyrrolidone, dextrin, chitosan, chitin, methyl cellulose, hydroxyethyl cellulose, etc.), a perfume, a rust inhibitor, a colorant, an extender, an antifoaming agent, an ultraviolet absorber, and the like.

The water-soluble film of the present invention is useful for various packaging applications and the like, particularly an application for unit packaging of a chemical, and the like. Such applications will be further explained.

Such chemicals are not particularly limited including a detergent, an agricultural chemical, and the like. The chemicals may be chemicals to be used by dissolution or dispersion in water and may be any of alkaline, neutral, or acidic one. Furthermore, the form of the chemicals may be in any state of granule, tablets, fine particle, powder, liquid, or the like.

In particular, the water-soluble film of the invention is useful for packaging a liquid detergent having a pH of 6 to 12, preferably 7 to 11, and a water amount of less than 10% by weight, preferably 0.1 to 7% by weight. In the case of packaging such a liquid detergent, the water-soluble film of the invention is less colored while in a water-soluble film hitherto known, coloration is increased with time.

As the above liquid detergent, there may be, for example, mentioned a liquid detergent comprising a higher fatty acid, pentaethylene glycol, and dipropylene glycol monomethyl ether, as a main component.

At the packaging of a chemical using the water-soluble film of the invention, there may be mentioned (1) a method wherein the film is previously made into a bag-form and then a chemical is packaged in the bag-form; (2) a method wherein a chemical is directly packaged in the film, and the like.

The invention also provides a package of a chemical, wherein a liquid chemical or a powder chemical is seal-packed with the water-soluble film of the invention and the chemical is usually included in an amount of 5 to 50 g.

Since the water-soluble film of the invention has extremely high water solubility, the water soluble polymer does not attach to a laundry at all, or the like, in the case of washing them by charging into a washer. In addition, since the b-value is small and transparency is high, the film has an advantage that the commercial value of a white detergent can be kept high.

EXAMPLE 1

The present invention is more specifically explained with reference to Examples, which do not limit the invention.

Incidentally, the "%" and "part(s)" in the following examples are shown on the basis of weight unless otherwise noted.

Also, the following evaluations were performed on the resulting films.

(Coloration of Film)

The coloration of the film was evaluated by measuring the b-value in accordance with JIS Z 8730 using a spectrophotometer "UV3100" manufactured by Shimadzu Corporation.

(Precipitation of Sulfite on Film Surface)

The precipitation of the sulfite on the film surface was visually evaluated.

(Solubility in Water at 20° C.)

A film sample was cut into a size of 40 mm×40 mm and fixed with putting it between slide mounts. Then, purified water (1 liter) was poured in a 1 liter beaker and the film fixed with the slide mounts was immersed in such water kept at a water temperature of 20° C. under stirring with a magnetic stirrer (length of a rotor: 3 cm, rotation number: 200 to 300 rpm). Then a time (second) required for dissolution of the film was measured. The term "dissolution" as used herein means that the film can no longer be visually observed, but herein encompasses the state that an insoluble fine particle having a diameter of not more than 1 mm is dispersed.

EXAMPLE 1

An aqueous dispersion of a resin composition having a solid concentration of 30% was obtained by adding 25 parts of glycerin and 12 parts of trimethylolpropane as the plasticizer (B), 1.0 part of sodium sulfite (C), 2 parts of polyoxyalkylene alkyl ether phosphate ester monoethanolamine salt as the surfactant (D), and water to 100 parts of a carboxyl group-modified PVA (A) having a viscosity of a 4% aqueous solution of 22.0 mPa·s (20° C.), an average degree of saponification of 97.2% by mol, and an amount of modification with monomethyl maleate of 4.0% by mol.

The obtained aqueous dispersion of the resin composition (80° C., already defoamed) was cast onto a hot plate heated to 80 to 90° C. and then dried at a temperature of 80 to 90° C. for 1 minute to give a PVA film having a thickness of 76 μm (sodium sulfite/total amount of plasticizer=0.03).

When coloration of the obtained PVA film was measured as mentioned above, the initial b-value was found to be 0.13. Moreover, when solubility in water at 20° C. was measured as mentioned above, it was found to be 23 seconds.

(Actual Packaging Test of Chemical)

The obtained PVA film was cut into a size of 12 cm×10 cm and formed into a bag (a size of 6 cm×10 cm) by sealing the two sides thereof by a heat sealer. In the bag was placed 30 g of a liquid detergent (main component: a higher fatty acid, pentaethylene glycol, dipropylene glycol monomethyl ether) having a pH of 9.0 and a water amount of 1.5%. Moreover, the remaining side was heat-sealed to give a packet-like package of a chemical (a size of 6 cm×10 cm).

The obtained sample was left at 80° C. for 72 hours under a dry atmosphere and then the b-value after lasting was measured and found to be 0.77.

On this occasion, no precipitation of sodium sulfite was observed on the film surface.

EXAMPLES 2 to 8

A PVA film was obtained in the same manner as in Example 1 except that the kind and amount of the plasticizer and sodium sulfite were as described in Table 1. The obtained film was evaluated similarly to Example 1.

COMPARATIVE EXAMPLE 1

A PVA film was obtained in the same manner as in Example 1 except that no sodium sulfite was added. The obtained film was evaluated similarly to Example 1.

COMPARATIVE EXAMPLE 2

A PVA film was obtained in the same manner as in Example 1 except that the additive amount of sodium sulfite was 0.7 part and the ratio of sodium sulfite to total amount of plasticizer is 0.02. The obtained film was evaluated similarly to Example 1. The initial b-value was found to be 0.17, but the b-value after lasting was so high as 1.11 and it could be judged that the film was visually obviously colored.

COMPARATIVE EXAMPLE 3

A PVA film was obtained in the same manner as in Example 1 except that 6 parts of glycerin and 4 parts of diglycerin were used as the plasticizer and 4 parts of sodium sulfite (sodium sulfite/total amount of plasticizer=0.4) was used. The obtained film was evaluated similarly to Example 1. The initial b-value was as low as 0.20, but sodium sulfite was precipitated on the film surface.

COMPARATIVE EXAMPLE 4

A PVA film was obtained in the same manner as in Example 1 except that 20 parts of glycerin was used as the plasticizer and 3.0 parts of sodium sulfite was used. The obtained film was evaluated similarly to Example 1. The initial b-value was as low as 0.26, but sodium sulfite was precipitated on the film surface.

The above results are shown in Table 1.

In the table, the content of the plasticizer and sodium sulfite was shown as parts by weight based on 100 parts by weight of the PVA resin.

In addition, the term "initial" of the b-value means a value immediately after a film formation, and the term "lasting" means a value after the above "Actual Packaging Test of Chemical".

TABLE 1

| | Content of plasticizer (B) | | | | Content of sulfite salt (C) | | b-value | | Solubility in water at 20° C. |
| --- | --- | --- | --- | --- | --- | --- | --- | --- | --- |
| | Gly | TMP | Di-Gly | Total amount | $Na_2SO_3$ | C/B | Initial | Lasting | (second) |
| Example 1 | 25 | 12 | — | 37 | 1.0 | 0.03 | 0.13 | 0.77 | 23 |
| Example 2 | 25 | 12 | — | 37 | 2.0 | 0.05 | 0.05 | 0.20 | 23 |
| Example 3 | 25 | 12 | — | 37 | 3.0 | 0.08 | −0.04 | −0.05 | 23 |
| Example 4 | 25 | 12 | — | 37 | 4.0 | 0.11 | 0.00 | −0.09 | 23 |
| Example 5 | 6 | — | 4 | 10 | 0.7 | 0.07 | 0.32 | 0.93 | 47 |
| Example 6 | 6 | — | 4 | 10 | 1.5 | 0.15 | 0.28 | 0.79 | 47 |
| Example 7 | 6 | — | 4 | 10 | 2.0 | 0.20 | 0.22 | 0.68 | 47 |
| Example 8 | 6 | — | 4 | 10 | 2.5 | 0.25 | 0.20 | 0.50 | 47 |
| Comparative Example 1 | 25 | 12 | — | 37 | 0 | — | 0.52 | 2.43 | 23 |
| Comparative Example 2 | 25 | 12 | — | 37 | 0.7 | 0.02 | 0.17 | 1.11 | 23 |

Gly: glycerin,
TMP: trimethylolpropane,
Di-Gly: diglycerin

While the invention has been described in detail and with reference to specific embodiments thereof, it will be apparent to one skilled in the art that various changes and modifications can be made therein without departing from the spirit and scope of the invention.

The present application is based on Japanese Patent Application No. 2003-417980 filed on Dec. 16, 2003, and the contents are incorporated herein by reference.

INDUSTRIAL APPLICABILITY

The water-soluble film of the invention is a water-soluble film excellent in water solubility, which is less likely to cause coloration at the time of film formation and coloration with time even upon contact with a chemical. Therefore, the film can be utilized in various applications, e.g., applications for packaging (unit packaging) of chemicals such as an agricultural chemical and a detergent, a film for (water pressure) transfer printing, sanitary goods such as a napkin and a paper diaper, a filth-treating good such as an ostomy bag, a medical supply such as a blood-adsorbing sheet, temporary substrates such as a raising seedling, a seed tape and a foundation cloth for embroidery, and the like. In particular, it is very useful in an application for packaging of a chemical (especially a liquid detergent).

The invention claimed is:

1. A water-soluble film, which is a polyvinyl alcohol film comprising a polyvinyl alcohol resin (A), wherein the water-soluble film has a time for dissolution in water at 20° C. of not more than 60 seconds in terms of a film thickness of 76 μm, a b-value of the film is not more than 0.5, and a b-value of the film after leaving at 80° C. for 72 hr is not more than 1.0.

2. The water-soluble film according to claim 1, wherein the polyvinyl alcohol resin (A) is an anionic group-modified polyvinyl alcohol resin having an amount of anionic group modification of 1 to 10% by mol.

3. The water-soluble film according to claim 2, wherein the anionic group-modified polyvinyl alcohol resin is a carboxyl group-modified polyvinyl alcohol resin.

4. The water-soluble film according to claim 3, wherein the carboxyl group-modified polyvinyl alcohol resin is a polyvinyl alcohol resin modified with any of maleic acid, a maleate, a monoalkyl maleate, and maleic anhydride.

5. The water-soluble film according to claim 1, wherein an average degree of saponification of the polyvinyl alcohol resin (A) is from 80.0 to 99.9% by mol.

6. The water-soluble film according to claim 1, wherein a viscosity at 20° C. of a 4% by weight aqueous solution of the polyvinyl alcohol resin (A) is from 10 to 35 mPa·s.

7. The water-soluble film according to claim 1, wherein a film thickness is from 5 to 100 μm.

8. The water-soluble film according to claim 1, which is used for packaging a liquid detergent having a pH of 6 to 12 and a water amount of less than 10% by weight.

9. A package of a chemical, wherein 5 to 50 g of a liquid chemical or a powder chemical is seal-packed with the water-soluble film according to claim 1.

* * * * *